United States Patent [19]

Bowen et al.

[11] Patent Number: 5,056,881
[45] Date of Patent: Oct. 15, 1991

[54] COLLIMATED LASER DIODE

[75] Inventors: Terry P. Bowen, Etters, Pa.; John R. Rowlette, Clemmons, N.C.

[73] Assignee: AMP Incorporated, Harrisburg, Pa.

[21] Appl. No.: 508,760

[22] Filed: Apr. 12, 1990

[51] Int. Cl.⁵ .................................. G02B 5/32
[52] U.S. Cl. ....................... 359/19; 369/103; 359/24; 385/14
[58] Field of Search ............... 350/3.7, 3.71, 3.72, 350/96.11, 3.75, 3.77; 369/103; 372/43

[56] References Cited

U.S. PATENT DOCUMENTS

| | | | |
|---|---|---|---|
| 4,497,534 | 2/1985 | Sincerbox | 350/380 |
| 4,731,772 | 3/1988 | Lee | 350/3.72 |
| 4,779,943 | 10/1988 | Tatsuno et al. | |
| 4,794,585 | 12/1988 | Lee | 350/162.21 |
| 4,993,799 | 2/1991 | Stein | 350/96.18 |

OTHER PUBLICATIONS

"Miniature Optics for Optical Recording", Gleen T. Sincerbox, SPIE vol. 935, Gradient-Index Optics and Miniature Optics (1988), pp. 63-76.
"Hybrid Diffractive-Refractive Lenses and Achromats", T. Stone and N. George, Applied Optics, vol. 27, No. 14, Jul. 15, 1988, pp. 2960-2971.
"Holographic Optical Head for Compact Disk Applications", W. Lee, Optical Engineering, vol. 28, No. 6, Jun. 1989, pp. 650-653.
"Diffractice Optical Elements for use in Infrared Systems", G. Swanson and W. Veldkamp, Optical Engineering, vol. 28, No. 6, Jun. 1989, pp. 605-608.

Primary Examiner—Bruce Y. Arnold
Assistant Examiner—J. P. Ryan

[57] ABSTRACT

An optical source comprises (a) a laser light source for emitting light in a light path; and (b) at least one holographic optical element disposed in the light path; wherein the laser light source and the holographic optical element are integrated into a monolithic strucuture. The holographic optical element collimates emitted light, circularizes emitted light, compensates for optical source wavelength shifts, launches the emitted light so that it is efficiently coupled to an optical fiber, and/or isolates the laser light source from interfering reflected light. Since the optical source is disposed in a single monolithic structure and a discrete holographic optical element may perform five distinct functions, the optical sources are compact, commercially versatile and easy to handle.

8 Claims, 1 Drawing Sheet

COLLIMATED LASER DIODE

FIELD OF THE INVENTION

The present invention relates to optical sources. More particularly, it relates to laser diodes which produce a collimated output.

BACKGROUND OF THE INVENTION

Laser diodes have been used as a light source in optical communications, laser printers and in compact laser disc players. Several manufacturers, including Lytel and Toshiba, currently produce laser diodes. These commercial products usually comprise a laser diode encapsulated in a "can" having a window disposed in the optical path of the light emitted from the laser diode, and electrical leads protruding from the can. A typical model is the TOLD 9200 Visible Laser Diode, sold by Toshiba America, Inc.

Currently available laser diode packages, however, have been inadequate in terms of their ability to collimate the optical output of the laser diode. Also, the optical elements used in combination with laser diodes to shape the light beam from an elliptical pattern to a circular pattern, i.e., circularizing the emitted light, are complicated and expensive. No means have heretofore been provided for collimating and circularizing the laser diode output while compensating for wavelength shifts of the laser diode. Further, the optical elements used with prior art laser diodes cause a portion of the emitted light to reflect back into the active cavity of the laser diode, disrupting stable performance. Finally, the laser diode and its associated optical elements form a bulky, complex and costly package.

U.S. Pat. No. 4,779,943 to Tatsuno, et al. discloses an optical system which comprises a laser diode and a holographic lens, wherein the optical system is purportedly reduced in weight and size and is simple in design compared to conventional systems consisting of a coupling lens and a cylindrical lens. However, the disclosed hologram lens is a discrete element; it is physically separate from the laser diode. The disclosed apparatus does not contemplate a connector for coupling an optical fiber thereto, nor does it disclose or suggest isolating the laser diode from interfering reflected light.

SUMMARY OF THE INVENTION

It is therefore an object of the present invention to provide a laser diode that is compact, inexpensive to manufacture, and commercially versatile.

It is another object of the present invention to provide a laser diode having a collimated optical output.

It is yet another object of the present invention to provide a laser diode having a circularized optical output.

It is yet another object of the present invention to provide a laser diode which compensates for optical source wavelength shifts.

It is yet another object of the present invention to provide a laser diode which launches, i.e., narrows, a beam to facilitate coupling to an optical fiber.

It is a further object of the present invention to provide a laser diode that can be coupled to an optical fiber while being shielded or protected from interfering reflected light.

These and other objects which will become apparent to persons of ordinary skill in the art are accomplished by providing an optical source, comprising a laser light source for emitting light in a light path; and at least one holographic optical element disposed in the light path, wherein the laser light source and the holographic optical element are mechanically integrated into a monolithic structure. In particular, in one embodiment, a laser light source and a holographic optical element are mounted in a hermetically sealed housing. The holographic optical element is disposed in the light path of the light emitted from the laser diode, for collimating, circularizing, wavelength compensating, launching and/or isolating the light emitted from the laser diode.

In another embodiment of the present invention, a well known can laser diode, packaged in a hermetic can, has a holographic optical element directly bonded to the window thereof. The single holographic optical element can perform the functions of collimating, circularizing, wavelength compensating launching and/or isolating the laser diode (or any combination thereof). Although laser diodes packaged in a hermetic can have been heretofore manufactured and sold in untold quantities, it has heretofore not been recognized by those skilled in the art that a collimated, circularized, wavelength compensated, launched and/or isolated optical source can be provided in a compact low-cost structure, by directly bonding a holographic optical element to the window of the can.

The optical sources according to the present invention are simple and compact in design, and commercially versatile because they can be disposed in a single monolithic structure and one holographic optical element can be designed to perform five distinct functions.

DETAILED DESCRIPTION OF THE PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Rather, applicants provide these embodiments so that the disclosure may be thorough and complete, and will fully convey the scope of the invention to those skilled in the art.

Figure 1:
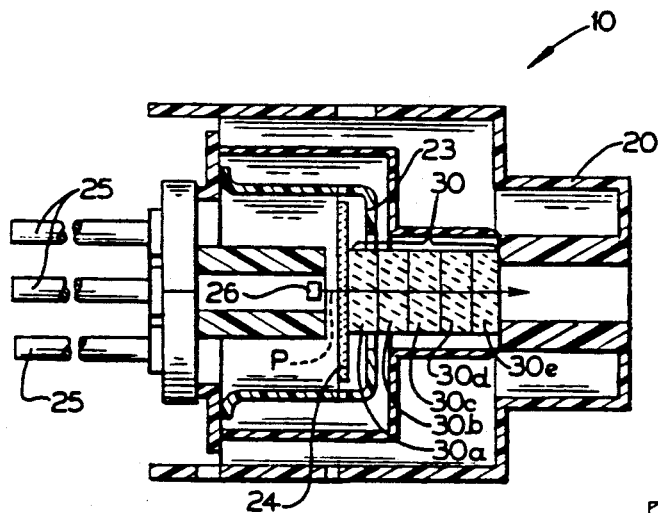
FIGS. 1-4 are cross-sectional views of collimated laser diodes according to the present invention.

Referring now to FIG. 1, collimated optical source 10 includes laser light source 26 for emitting light in light path P, and enclosed within hermetically sealed can 23. Electrical wires 25 for powering laser light source 26 are also shown. Disposed in the light path P and bonded to the outside surface of the can is holographic optical element ("HOE") 30. The can and the HOE are enclosed within housing 20, thus providing a monolithic structure. The laser light source and HOE alternatively can be mounted in housing 20 without using the can. To obtain maximum transmission, the HOE may be aligned in light path P using an optical detector which detects maximum output from the holographic optical element.

Various laser light sources, e.g., laser diodes, can be utilized in the present invention. Examples include lasers emitting light having a wavelength of about 780 nanometers (nm) which are used in compact disc players, and those emitting light having a wavelength of about 670 nm in the visible red region suitable for scanners used in supermarket checkout systems. Laser diodes emitting light having wavelengths of 820, 850 and 1300 nm are also known. The former two diodes are useful in optical data storage applications, while all have utility in optical communications for the transport of telecommunications, data and video.

A single, discrete HOE can perform the function of more than one reflective or refractive element. In FIG. 1, for example, HOE 30 can be designed to perform five distinct functions: (1) collimating the light beam emitted from the laser; (2) circularizing the laser emitted light; (3) isolating the laser light source from reflected light; (4) optically launching the emitted light, i.e., narrowing the cross-sectional diameter of the emitted light to facilitate optical launching to an optical fiber; and (5) compensating for optical source wavelength shifts. In the alternative, a separate HOE can be employed for each of the above functions. This variation is illustrated in FIG. 1 as HOE's 30a, 30b, 30c, 30d, and 30e which perform functions 1, 2, 3, 4, and 5, respectively. Further, HOE's can be prepared to preform any combination of two, three or four of the above functions.

HOE's can be prepared by using basic optical apparatus such as small lenses, mirrors, a light source and a beam splitter. See, for example, chapters 13-14 in Kasper et al., *The Complete Book of Holograms; How They Work and How to Make Them*, Wiley & Sons, New York (1987). HOE's also can be designed by computer, and prepared by E-beam lithography. See, for example, Swansen et al., *Optical Engineering*, "Diffractive Optical Elements for use in Infrared Systems," 28(6) pages 605-08 (1989). Methods for preparing wavelength compensated HOE's are known in the art as described, for example, in Sincerbox, SPIE, "Miniature Optics for Optical Recording," 935 pages 63-76, 72 (1988).

Figure 2:
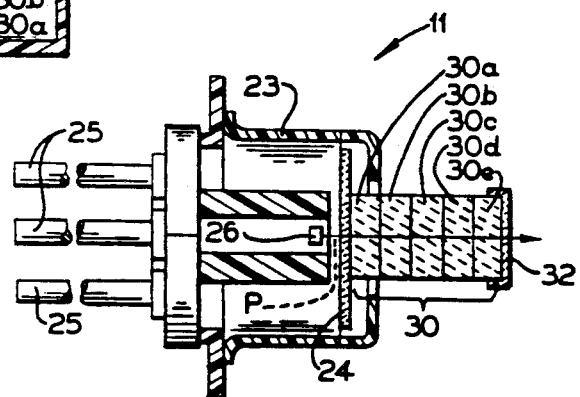

Referring now to FIG. 2, optical source 11 comprises a can 23 having hermetically enclosed therein laser light source 26 for emitting light in light path P. Disposed in the light path and within the can is transparent window 24. Bonded to the surface of the window is HOE 30. The HOE may be aligned on the window by means of an optical detector, as described above. The HOE may be bonded to the window using a light curing adhesive. Suitable adhesives are available from ICI Resins US of Wilmington, Mass. Protective cover 32 may be optionally provided and is adapted to engage HOE 30 and be secured thereto.

Figure 3:
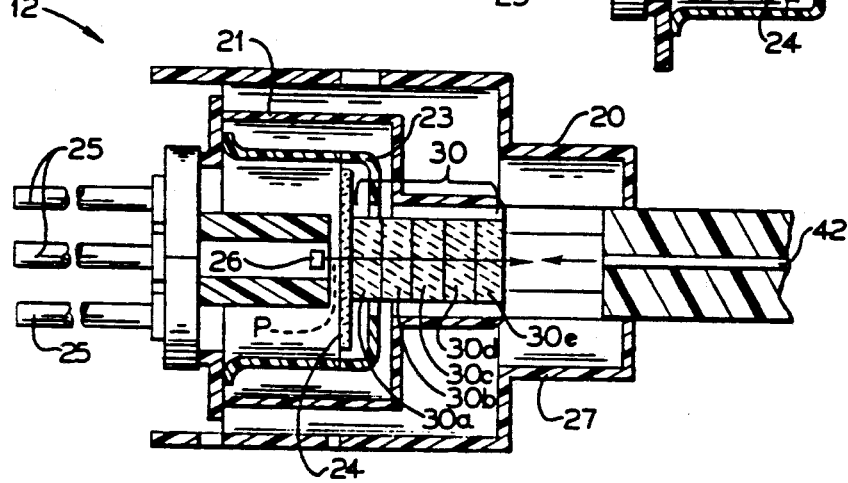

In FIG. 3, optical source 12 comprises can 23 having hermetically enclosed therein laser light source 26 and window 24 disposed in light path P. HOE 30 is bonded to window 24 in the same manner described in reference to FIG. 2. The can and the HOE may be enclosed in housing 21 to form a monolithic structure. Alternatively, the laser source, window and HOE can be mounted within the housing without the hermetic can 23. In yet another alternative, two HOE's may be directly bonded to the can 23, over the window 24, and separate housing 21 need not be employed. The end 27 of the housing in the direction of the light path P is adapted to receive at least an end of optical fiber 42, which may itself be mounted in a light fiber connector.

Figure 4:
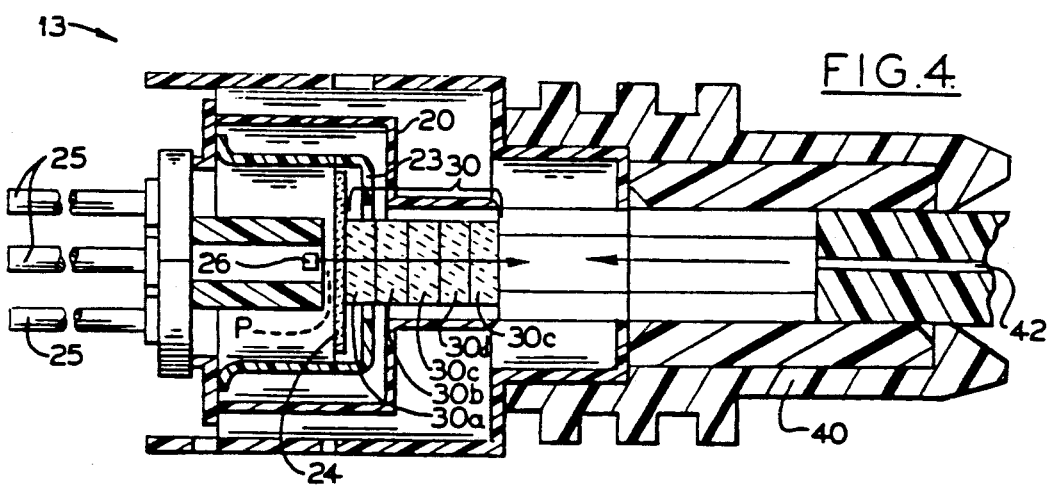

In FIG. 4, optical source 13 comprises can 23 having enclosed therein laser light source 26 for emitting light in light path P and disposed in light path P, window 24. Bonded to the window is HOE 30. Electrical leads 25 protrude outwardly from can 23. A fiber optic connector 40 is affixed to housing 20. The connector is adapted to receive and have secured therein a connectorized end of optical fiber 42.

The light sources of the present invention are superior to prior art laser diode packages because the functions which heretofore had been performed by as many as five discrete optical devices such as a collimator, isolator, wavelength compensator focusing device and launcher, are replaced by a single discrete optical element which performs all of these functions. The compactness of the optical sources of the present invention is also attributable to the direct bonding of elements upon one another, and the housing which encloses the elements in a monolithic structure which is easy to handle and adaptable to a variety of commercial applications. Further, the design of the optical sources facilitates coupling of the device to a variety of optical fibers.

It is understood that the above-described embodiments are merely illustrative of the application of the principles of this invention. Numerous other embodiments may become apparent or be devised by those skilled in the art without departing from the spirit and scope of the invention, as defined by the claims hereinbelow.

That which is claimed is:

1. An optical source comprising:
   (a) a laser light source hermetically encapsulated in a can, said can having a window for emitting light from said laser light source;
   (b) a single discrete holographic optical element consisting of a collimator, a circular polarizer, an isolator, a launcher and a wavelength compensator;
   (c) means for bonding said holographic optical element to said window, thereby forming a monolithic structure.

2. The optical source of claim 1 wherein the isolator prevents light from being reflected back onto the laser light source.

3. The optical source of claim 1, wherein said launcher narrows the cross-sectional diameter of said emitted light.

4. The optical source of claim 1, wherein said wavelength compensator accounts for optical source wavelengths shifts thereby assuring nearly uniform wavelength output.

5. An optical source comprising:
   (a) a laser light source hermetically encapsulated in a can, said can having a window for emitting light from said laser light source;
   (b) a single discrete holographic optical element consisting of a collimator, a circular polarizer, an isolator, a launcher and a wavelength compensator;
   (c) means for optically coupling an optical fiber to said light source;
   (d) means for bonding said laser light source, said holographic optical element and said optical coupling means into a monolithic structure.

6. The optical source of claim 5, wherein the isolator prevents light from being reflected back onto the laser light source.

7. The optical source of claim 5, wherein said launcher narrows the cross-sectional diameter of said emitted light.

8. The optical source of claim 5, wherein said wavelength compensator accounts for optical source wavelength shift thereby assuring nearly uniform wavelength output.

* * * * *